(12) United States Patent
Padmanabhan

(10) Patent No.: US 10,337,877 B1
(45) Date of Patent: Jul. 2, 2019

(54) COMMUNICATION WITH MOBILE DEVICES UTILIZING LIGHT EMITTING DIODES

(71) Applicant: Amazon Technologies, Inc., Seattle, WA (US)

(72) Inventor: Neeresh Padmanabhan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 15/284,342

(22) Filed: Oct. 3, 2016

(51) Int. Cl.
| | |
|---|---|
| *G01C 21/36* | (2006.01) |
| *H04W 4/02* | (2018.01) |
| *H04L 29/08* | (2006.01) |
| *H04L 12/26* | (2006.01) |
| *H04B 10/50* | (2013.01) |
| *H04B 1/3827* | (2015.01) |

(52) U.S. Cl.
CPC ..... *G01C 21/3602* (2013.01); *G01C 21/3632* (2013.01); *H04B 10/502* (2013.01); *H04L 43/16* (2013.01); *H04L 67/306* (2013.01); *H04W 4/025* (2013.01); *H04B 1/3833* (2013.01)

(58) Field of Classification Search
CPC ............ G01C 21/3602; G01C 21/3632; H04B 10/502; H04L 43/16; H04L 67/306
USPC ......................................................... 701/420
See application file for complete search history.

(56) References Cited

U.S. PATENT DOCUMENTS

| | | | |
|---|---|---|---|
| 10,205,530 B2 * | 2/2019 | Pederson | H04B 10/524 |
| 2007/0165244 A1 * | 7/2007 | Yukhin | G06K 9/00255 |
| | | | 356/603 |
| 2014/0328599 A1 * | 11/2014 | Pederson | H04B 10/116 |
| | | | 398/118 |
| 2015/0198941 A1 * | 7/2015 | Pederson | G06Q 30/00 |
| | | | 700/275 |

* cited by examiner

*Primary Examiner* — Muhammad Shafi
(74) *Attorney, Agent, or Firm* — Knobbe, Martens, Olson & Bear, LLP

(57) ABSTRACT

A communication system and method for the utilization of LED communication networks to facilitate user interaction. The controller can transmit a unique identification code to each of the LEDs. The client computing device can receive the unique identification code and send the received identification code to the controller. The controller can identify the location of the client computing device based on the received identification code.

20 Claims, 13 Drawing Sheets

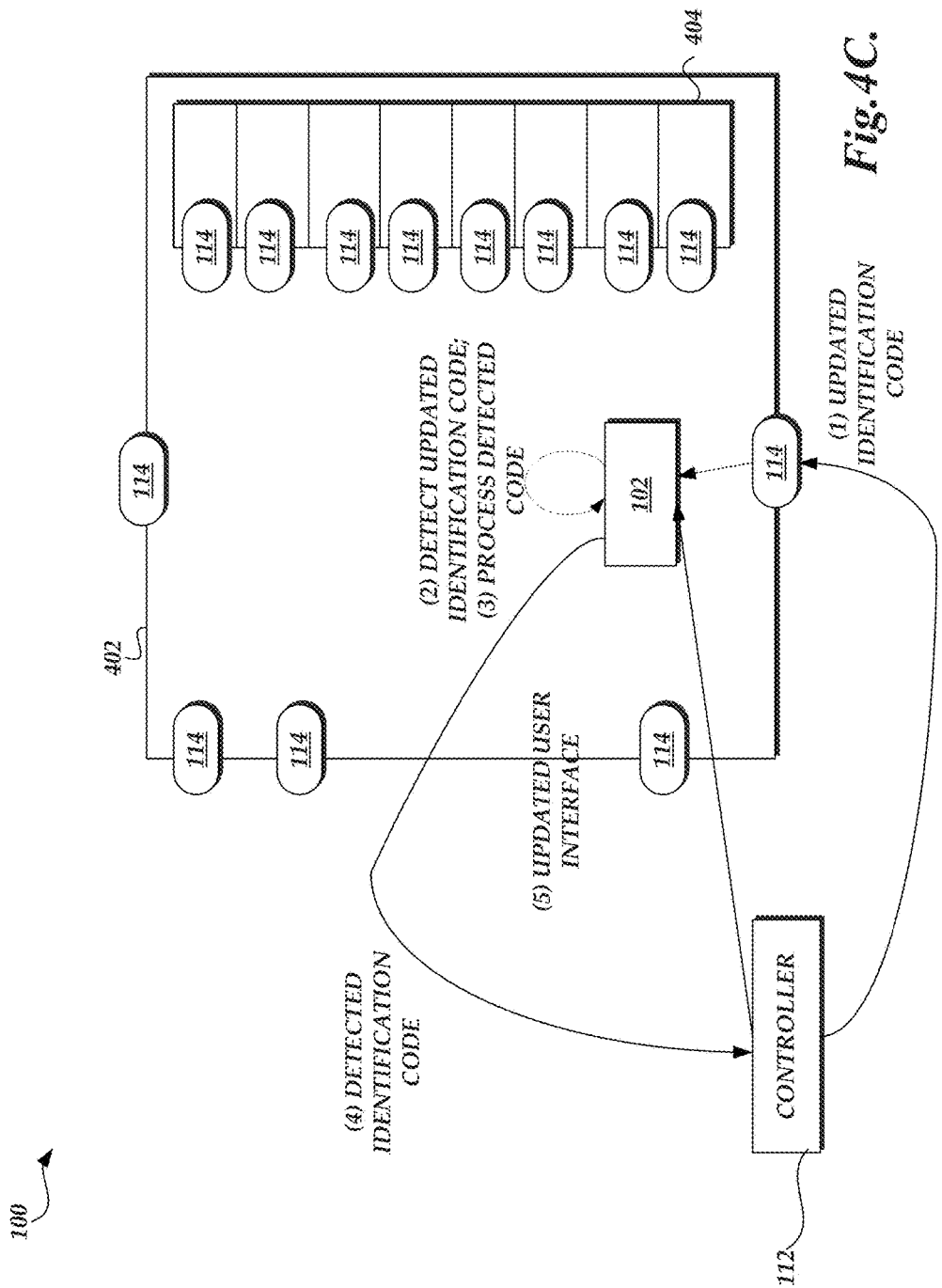

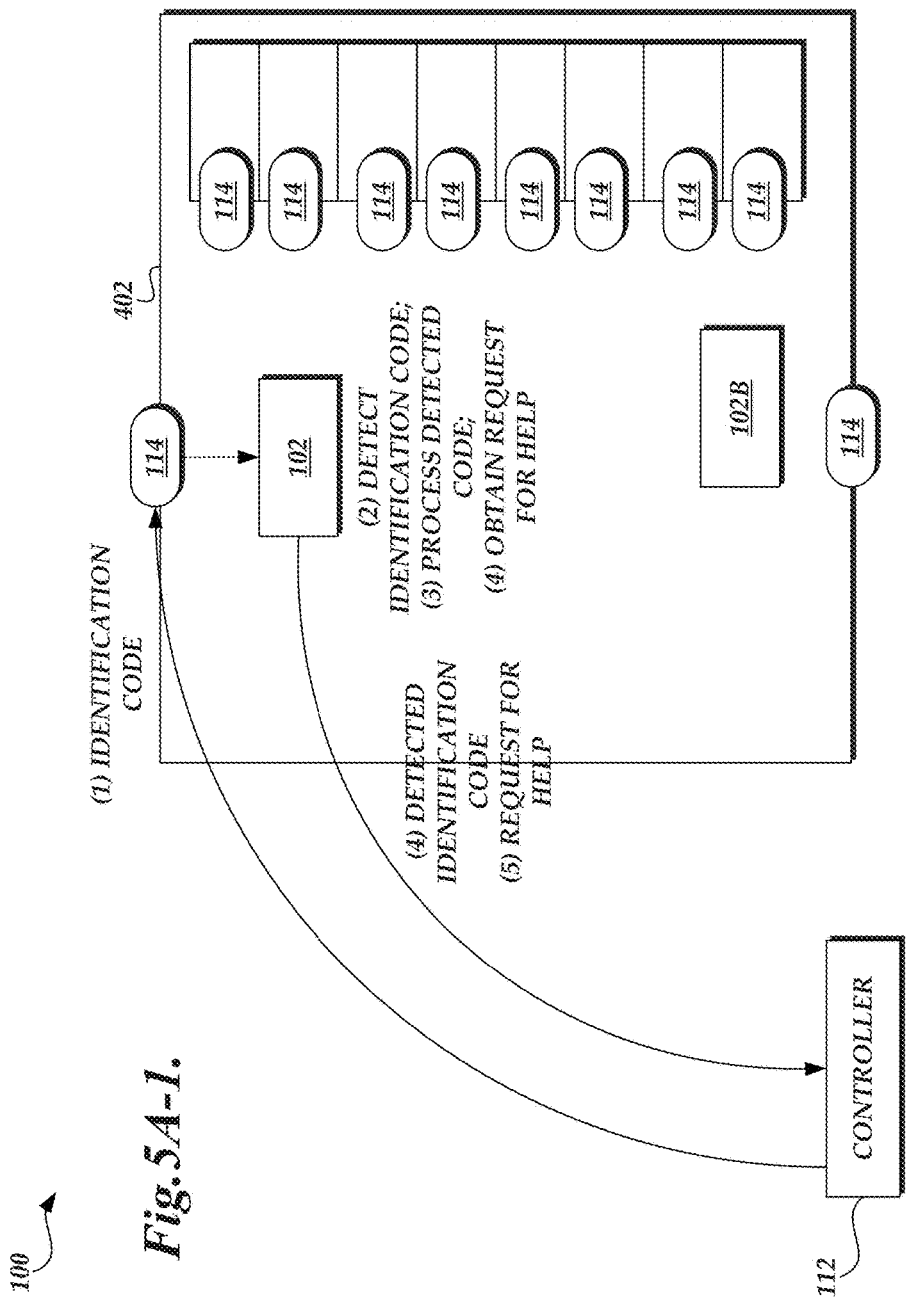

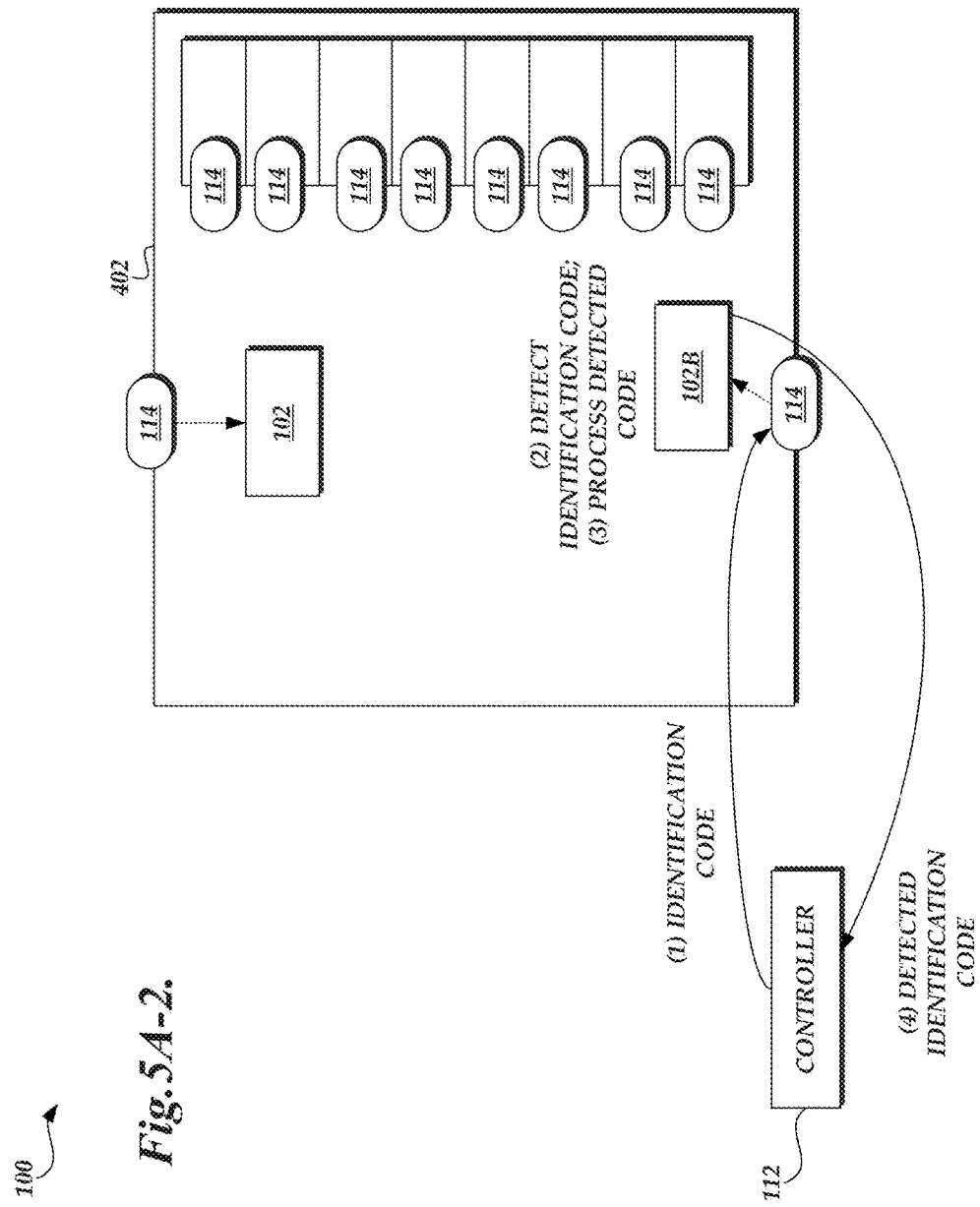

US 10,337,877 B1

COMMUNICATION WITH MOBILE DEVICES UTILIZING LIGHT EMITTING DIODES

BACKGROUND

Generally described, computing devices utilize a communication network, or a series of communication networks, to exchange data. Companies and organizations operate computer networks that interconnect a number of computing devices to support operations or provide services to third parties. Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. In addition, data centers may provide other computing resources, including hardware computing capacity, data storage space, network bandwidth, and the like.

To facilitate increased utilization of data center resources, service providers allow computing devices to connect to numerous computer networks wirelessly. There are many forms of technology that allow computing devices to transmit data to or receive from a wireless network. Wireless technology allows computing devices to communicate with systems, such as a data center, without the need of an electrical conductor connection. In turn, users can stay connected to a data center and utilize data center resources while moving around freely.

Data centers can use transceivers that transmit and receive data to the public. In some environments, the computing devices that communicate via the communication network can correspond to devices having a primary function as a computing device, such as a laptop or a tabloid. In other environments, at least some portion of the computing devices that communicate via the communication network can correspond to embedded devices or thin devices that have at least one alternative primary function, such as a mobile phone, while also providing at least limited computing functionality.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 4C is a block diagram of the LED communication system of FIG. 1 illustrating the second interaction between the illustrated components for updating the location of the client computing device by transmitting an updated identification code, detecting and processing the identification code, and updating a user interface of the client computing device in accordance with an illustrated embodiment;

FIG. 5A-1 is a block diagram of the LED communication system of FIG. 1 illustrating the interaction between the illustrated components for requesting help from a client computing device by detecting and processing an identification code, and transmitting a request for help in accordance with an illustrated embodiment;

FIG. 5A-2 is a block diagram of the LED communication system of FIG. 1 illustrating the interaction between the illustrated components for locating the service device by detecting and processing an identification code and transmitting the identification code to the controller in accordance with an illustrated embodiment;

DETAILED DESCRIPTION

Figure 1:
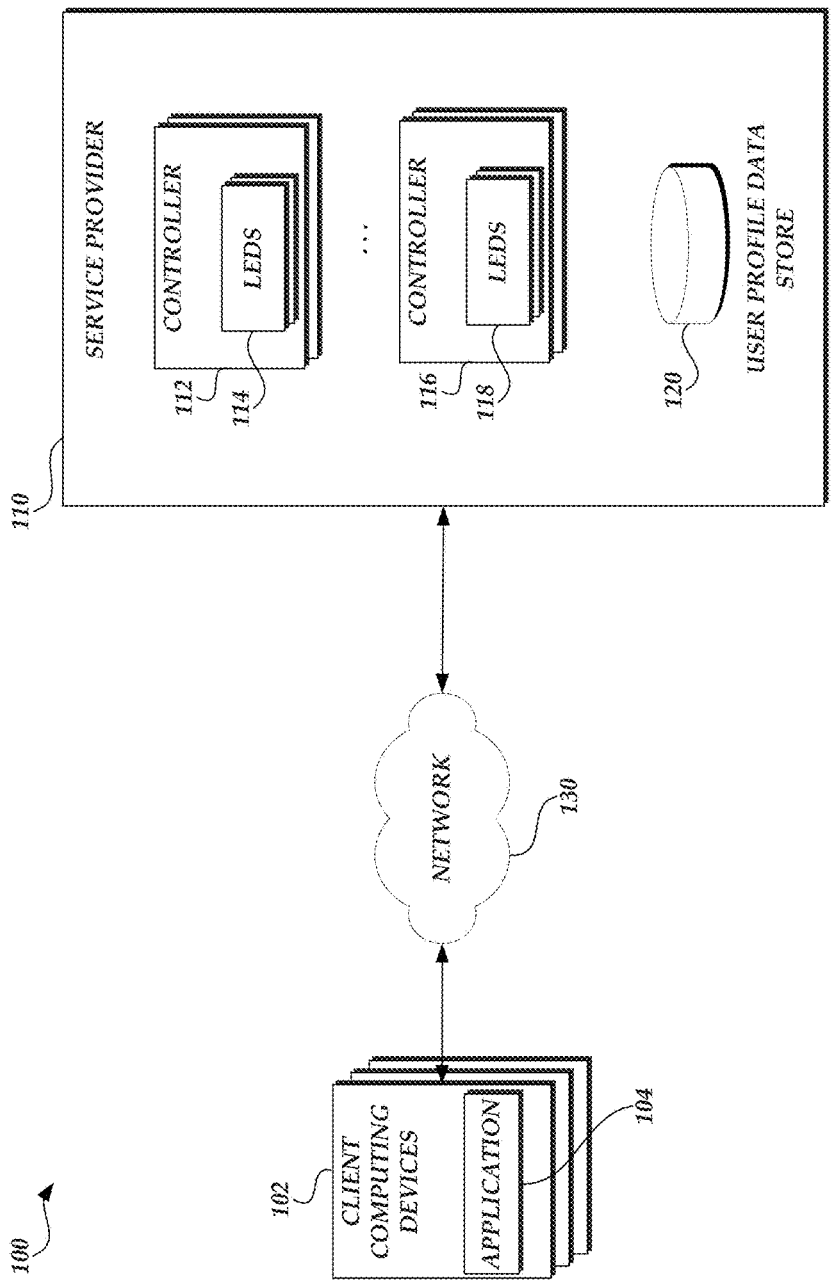
FIG. 1 is a block diagram of an LED communication system that includes one or more client computing devices, one or more service providers, and a network according to one embodiment.

Generally described, the present application corresponds to the utilization of wireless communications to facilitate user interaction. More specifically, aspects of the present application correspond to the utilization of embedded signals transmitted to a series of LEDs corresponding to individual LEDs being powered on and off. Mobile devices can detect the embedded signals and transmit the detected data to the controller. In turn, the controller can use the detected embedded signals to determine the current location (or approximate location) of the mobile device by associating positional information about the individual LED (or set of LEDs) transmitted in the embedded signal to the mobile device.

Illustratively, the controller can perform further actions based on the determined current location of the mobile device and a known or predicted destination. In one embodiment, the controller can determine a path between the determined current location and the destination, such as via a user profile of orders to be picked. The controller can then transmit updated embedded signals to the LEDs to track the mobile device along the path (e.g., having the mobile device detect additional signals and send the signals back to the controller). Additionally, the controller can generate or send user interface data to the mobile device to provide interfaces to guide the user of the mobile device to a particular location or along the determined path. Still further, if the controller determines that the mobile device is proximate to the destination, the controller can generate a vendor activation signal to initiate an action to be implemented by a vendor corresponding to the mobile device. The controller may also send the current location of the mobile device to staff members in order to locate users of a mobile device in need of help.

As previously described, each LED may receive one or more unique identification code from the controller. The unique identification codes can be encoded as a series of flashes transmitted by the LED based on toggling an on and off state in rapid succession. The encoding of data utilizing toggling of the LEDs can generally be referred to as Light Fidelity or Li-Fi. Illustratively, the toggling of LEDs can be captured by a camera on a mobile device and processed to determine one or more encoded unique identifiers. In some embodiments, the LEDs may transmit a single embedded unique identifier configured for a set of mobile devices. In other embodiments, the LEDs may transmit multiple embedded unique identifiers such that some mobile devices may ignore some of the embedded identifiers. Once processed, the mobile device can report back to the controller with the captured identification code. The controller can approximate a current location of the mobile device based on the identification code sent by the mobile device by identifying which LED transmitted the identification code. The controller can identify a path of travel to a destination location based on a user's profile. The controller can then identify a path of travel and generate a corresponding guide user interface data to send to the mobile device. The process can be repeated until the mobile device is determined to be at the destination. A path of travel can also create an optimized path if there are multiple destination locations.

With reference to an illustrative example, a mobile device is in communication with a services provider that provides one or more remote command services and user interface messages. The controller can facilitate initial communication by transmitting individual identification codes to a number of LEDs. Thus, each LED can transmit its own unique identification code encoded in successive light emissions by turning on and off. The controller learns of the mobile device when the mobile device detects one or more identification codes based on the proximity of the mobile device to the LEDs and transmits the received one or more identification codes to the controller. The controller can then identify the current location of the mobile device by identifying the location of the LED that transmitted the particular identification code.

With continued reference to the previous example, the controller guides the mobile device to a destination location by identifying a path of travel from the current location of the mobile device to the destination location based on a user's profile. The controller can guide the user visually by transmitting an updated identification code to an LED located in the path of travel. The updated identification code can correspond to an identifier that is unique or specific to the mobile device, such as a MAC address, electronic serial number ("ESN"), Mobile Equipment Identifier ("MEID"), as well as other unique identifiers provided by the mobile device manufacturer or software provider. In other examples, the updated identification code may not necessarily correspond to individual mobile devices. The controller can also guide the user by sending user interface data to the mobile device in order to display a user interface indicating a path of travel. For example, an arrow can show the direction of the destination location.

In accordance with aspects of the present application, the controller can utilize the mobile device to generate a corresponding guide to service employees if the user of the mobile device requires assistance. In some embodiments, a user can select a request for help on a user interface of a mobile device. The mobile device can capture a unique identification code and transmit the code to the controller. The controller may identify the current location of the mobile device and identify a path of travel from the nearest available staff member to the mobile device. The controller can then generate a corresponding guide user interface data for the mobile device or the service device of the staff member to display the relative locations of both the mobile device and the service device, allowing the staff member to quickly find the user in need of help.

With reference to an illustrative example, the LED communication system is used in a fulfillment center for inventory management. The mobile devices are industrial robots that can perform tasks, such as shelf-picking, item tracking, and inventory transportation. In this example, the LED communication system enables automated inventory management by detecting the location of the industrial robots and generating a path of travel and an action upon arrival of a destination location.

Although aspects of some embodiments described in the disclosure will focus, for the purpose of illustration, on the illustrative interactions for identifying a location of a mobile device using identification codes, one skilled in the relevant art will appreciate that the examples are illustrative only and are not intended to be limiting. More specifically, although aspects of the present application will be described with regard to guiding a mobile device to a destination location and assisting a staff member to locate a user of the mobile device, one skilled in the relevant art will appreciate that a description of any methodology identified for any specific type of object or element may also be applied to different types of objects or elements and the illustrative descriptions should not be limited solely to the discussed object or element.

FIG. 1 is a block diagram depicting an LED communication system 100 including multiple client computing devices 102 and a service provider 110 in communication via a network 130. While the client computing devices 102 are shown as a group within FIG. 1, the client computing devices 102 may be geographically distant, and independently owned or operated. For example, the client computing devices 102 could represent a multitude of users in various global, continental, or regional locations accessing the service provider system 110. Accordingly, the groupings of client computing devices 102 within FIG. 1 is intended to represent a logical, rather than physical, grouping. Similarly, while one set of illustrative components is shown to represent the service provider system 110, multiple instances of each component may be present within the LED communication system 100, and such components may be located within geographically diverse areas (e.g., globally, continentally, or regionally), in order to provide a wide geographical presence for the LED communication system 100.

Network 130 may be any wired network, wireless network, or combination thereof. In addition, the network 130 may be a personal area network, local area network, wide area network, cable network, satellite network, cellular telephone network, or combination thereof. In the example environment of FIG. 1, network 130 is a global area network (GAN), such as the Internet. Protocols and components for communicating via the other aforementioned types of communication networks are well known to those skilled in the art of computer communications and thus, need not be described in more detail herein. While each of the client computing devices 102 and the service provider system 110 is depicted as having a single connection to the network 130, individual components of the client computing devices 102 and service provider system 110 may be connected to the network 130 at disparate points.

Client computing devices 102 may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile device, electronic book reader, set-top box, camera, digital media player, and the like. Each client computing device 102 may include one or more data stores (not shown in FIG. 1) including various applications or computer-executable instructions, such as a device application 104 or web browsers, used to implement the embodiments disclosed herein.

In some embodiments, the user may use multiple devices. For example, the user may use a kiosk or a scanner that can be used as an identifier, a key, or other device that can transmit or receive information, and can be used in any of the interactions of FIGS. 4A-4D, 5A-1, 5A-2, and 5B. The kiosk can be used to transmit or receive information about the LEDs 114, the client computing device 102, or the controller 112.

In accordance with embodiments, the service provider system 110 includes a set of controllers 112, 116 that can generate identification codes and transmit them to their respective LEDs 114, 118. The set of controllers 112, 116 may also communicate to the client computing devices 102. In some embodiments, the controllers 112, 116 receive identification codes that the client computing devices 102 received from the one or more LEDs 114, 118. The controllers 112, 116 may also transmit user interface data to the client computing devices 102. In some embodiments, the service provider system 110 can also include a user profile data store 120 for maintaining user profile information for processing the browser content, determining characteristics of a user, identifying a destination location of the user, or to retain information created during interaction with the client computing device 102. It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the controller 112, 116 and LEDs 114, 118 may be executed by one or more virtual machines implemented in a hosted computing environment. Additionally, the user profile data store 120 may correspond to multiple physical or virtual computing resources that may logically be represented as a single component, but may be implement in a distributed manner.

Figure 2:
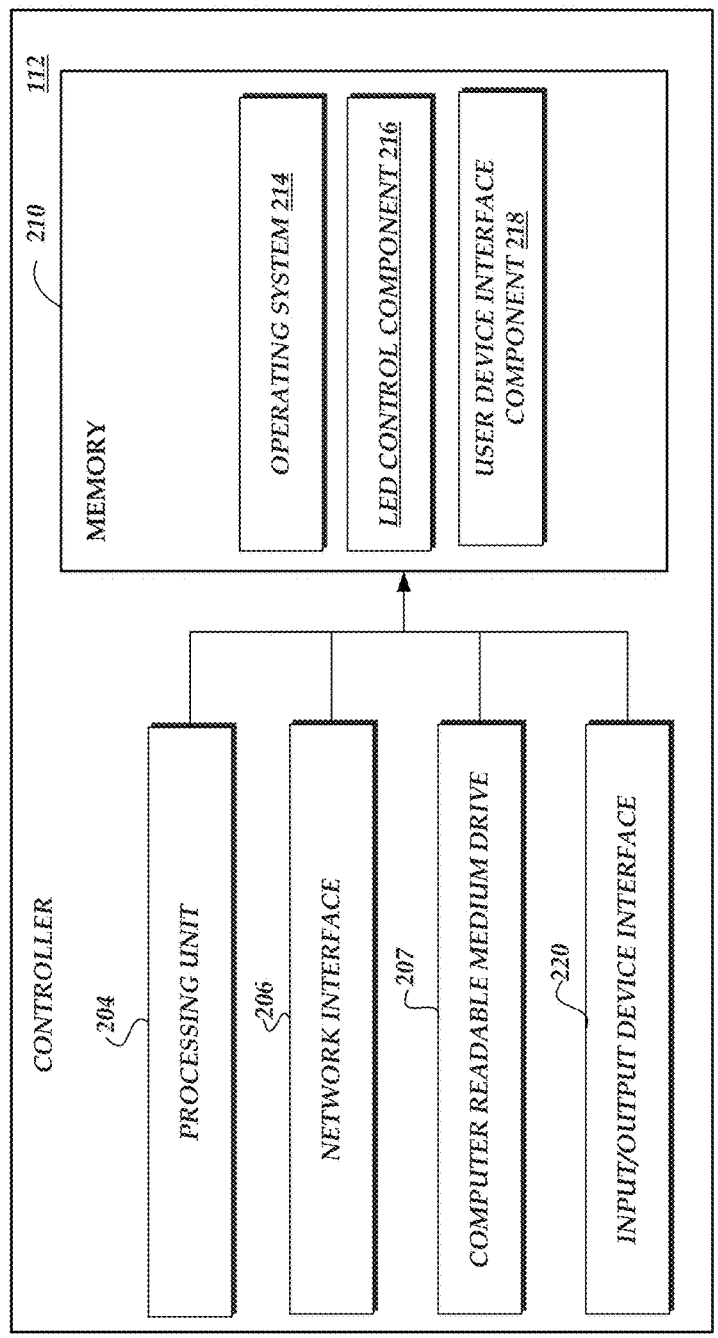
FIG. 2 is a block diagram of illustrative components of a controller configured to connect with one or more LEDs and one or more client computing devices in accordance with an illustrative embodiment.

FIG. 2 depicts one embodiment of an architecture of an illustrative controller 112 configured to connect with one or more LEDs 114 and one or more client computing devices 102. The general architecture of the controller 112 depicted in FIG. 2 includes an arrangement of computer hardware and software components that may be used to implement aspects of the present disclosure. As illustrated, the hosting environment includes a processing unit 204, a network interface 206, a computer readable medium drive 207, an input/output device interface 220, and a memory 210 all of which may communicate with one another by way of a communication bus.

The network interface 206 may provide connectivity to one or more networks or computing systems, such as the network 130 of FIG. 1. The processing unit 204 may thus receive information and instructions from other computing systems or services via a network. The processing unit 204 may also communicate to and from memory 210 and further provide output information. In some embodiments, the hosting environment may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the controller 112. The memory 210 may include an LED control component 216 used by the processing unit 204 to generate commands that control the encoded successive light emissions representing location identifiers (or identification codes).

The memory 210 can further include a user device interface component 218 for communication with the client computing devices 102, implementing aspects of the present disclosure. For example, in one embodiment, the controller 112 can interface with a corresponding browser on the client computing device 102. Additionally, in some embodiments, the other components can further implement one or more aspects of the functionality attributable to the browsing component, such as an application 104, of the client computing device 102. Accordingly, one skilled in the relevant art will appreciate that the controller 112 can implement all or portions of the functionality described with regard to the function of the browsing component, such as an application 104, of the client computing device 102.

Figure 3:
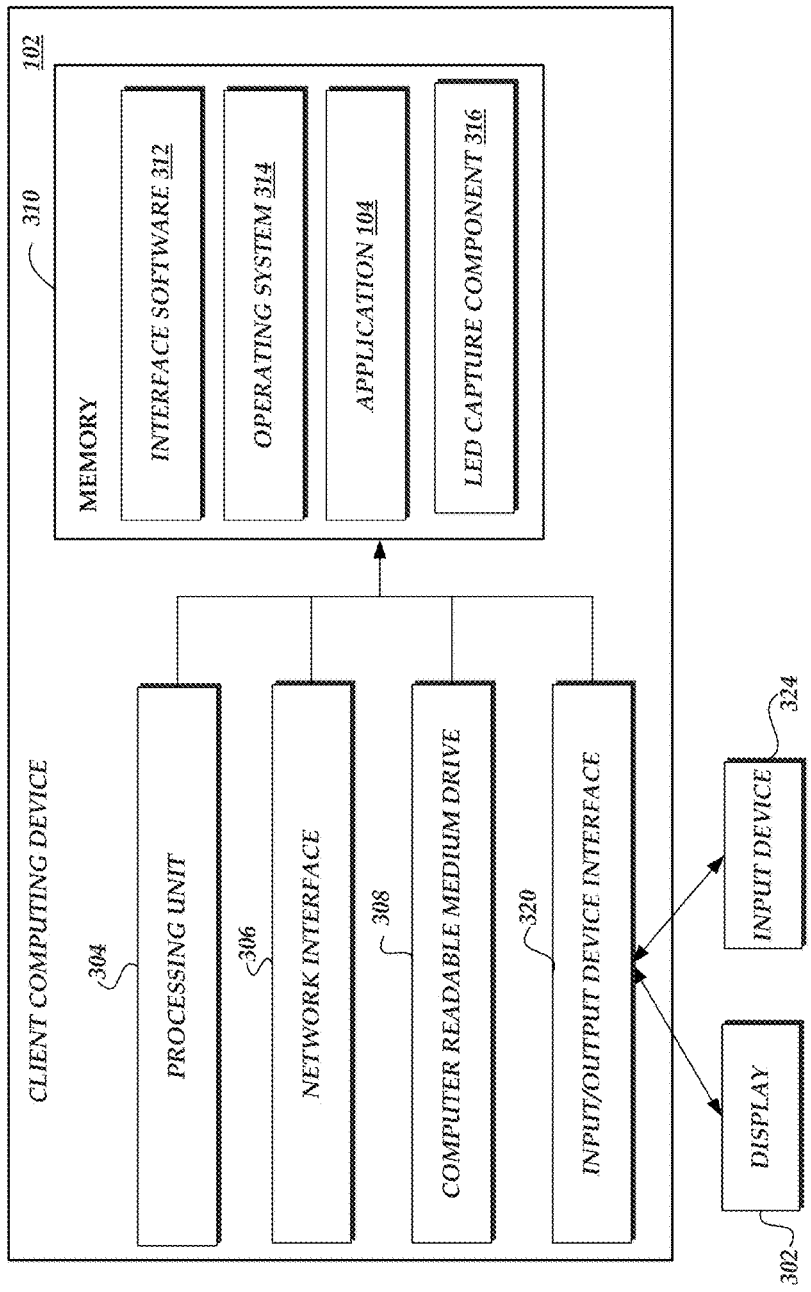
FIG. 3 is a block diagram of illustrative components of a client computing device configured to connect with a service provider via a network and receive data from the LEDs via the input device interface in accordance with an illustrative embodiment.

FIG. 3 depicts one embodiment of an architecture of an illustrative client computing device 102 that can generate and process browser content and is configured to connect with a service provider 110 via a network 130 and receive data from the LEDs 114 via the input device interface 320 in accordance with the present application. The general architecture of the client computing device 102 depicted in FIG. 3 includes an arrangement of computer hardware and software components that may be used to implement aspects of the present disclosure. As illustrated, the client computing device 102 includes a processing unit 304, a network interface 306, a computer readable medium drive 308, an input/output device interface 320, an optional display 302, an input device 324, and a memory 310 all of which may communicate with one another by way of a communication bus.

The network interface 306 may provide connectivity to one or more networks or computing systems, such as the network 130 of FIG. 1. As previously indicated, the client computing device 102 can communicate with network 130 in accordance with a wide variety of wired and wireless network protocols, including by not limited to, the 802.11x ("Wi-Fi") air interface standard as well as second generation, third generation, fourth generation and fifth generation air interface standards (WCDMA, CDMA2000, LTE, LTE-A) and the like. The processing unit 304 may thus receive information and instructions from other computing systems or services via a network. The processing unit 304 may also communicate to and from memory 310 and further provide output information for an optional display 302 via the input/output device interface 330. The input/output device interface 320 may also accept input from the input device 324, such as a keyboard, mouse, digital pen, etc. Additionally, as will be described in greater detail below, the input device 324 can include one or more inputs from components that are operable to indicate movement, tilt, or orientation of the client computing device 102, such as accelerometers, tilt sensors, and the like. The inputs to the client computing device 102 may be internal to the device, such as contained within a housing, or external to the device and connected via a wired or wireless interface. The memory 310 may also include an LED capture component 316, which include instructions used by the processing unit 304 to capture the transmission of the LEDs, such as by using a photodiode (e.g. a camera on a mobile device).

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the client computing device 102. The memory 310 may further include computer program instructions and other information for implementing aspects of the present disclosure. For example, in one embodiment, the memory 310 includes a browser application, such as an application 104, for accessing content and communicating with and processing information from one or more content providers 120. Additionally, for purposes of illustration, the browser application, such as an application 104, can interface with the display 302 using the interface software 312. The memory 310 may store an operating system 314 that provides computer program instructions for use by the processing unit 304 in the general administration and operation of the controller 112.

Turning now to FIGS. 4A-4D, illustrative interactions between the components of the LED communication system 100 to locate a client computing device 102 and guide the client computing device 102 to a destination location 404 will be described. More specifically, FIGS. 4A-4D will be described with regard to interactions between a client computing device 102, LEDs 114, and a controller 112 in a room 402, guiding the client computing device 102 to a destination location 404. Additionally, although depicted as a single client computing device 102, in some embodiments, the LED communication system 100 can interact with a plurality of client computing devices 102 using the same processes illustrated in FIGS. 4A-4D.

Figure 4A:
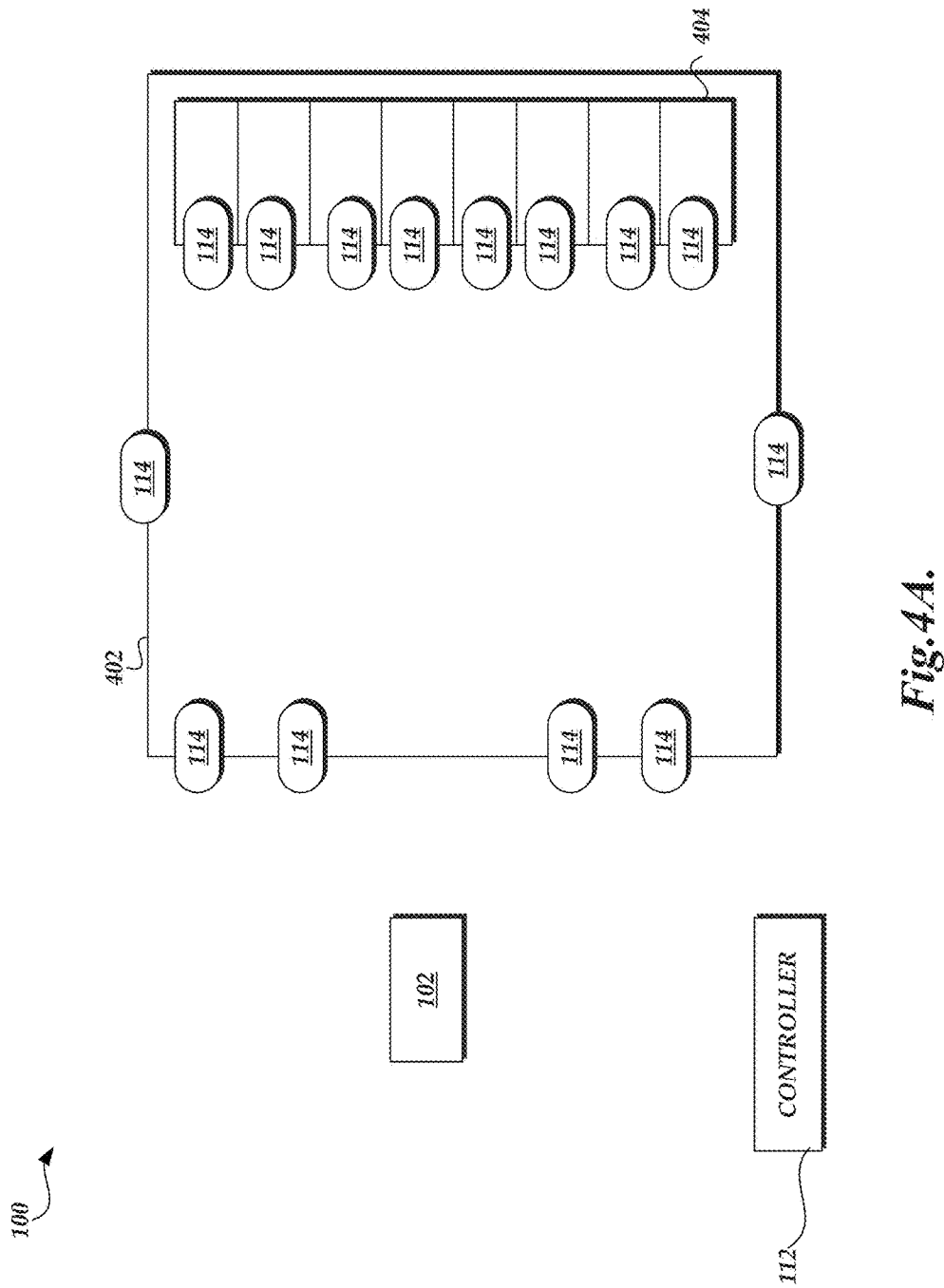
FIG. 4A is a block diagram of the LED communication system of FIG. 1 illustrating the LEDs and a destination location within a room, a controller, and a client computing device in accordance with an illustrated embodiment.

With reference to FIG. 4A, the LED communication system illustrating the LEDs and a destination location within a room, a controller, and a client computing device will be described. The LEDs 114 are placed in, near, and around a room 402. The LEDs are configured to transmit identification codes by a succession of light emissions sent by the controller 112. Each LED 114 can receive from the controller 112 or be pre-configured to transmit one or more identification codes. The controller 112 may be transmitting the identification codes to the LED 114, or a command that the LED 114 processes to determine which code or when to transmit. The codes can be updated or specified unique to a particular user of the client computing device 102. The LEDs can also be configured to transmit multiple unique identification codes (such as by time shifting, frequency allocation, and the like). For example, in embodiments in which multiple mobile devices may be trying to detect individualized embedded signals, each mobile device may be allocated a time slot in which it will attempt to detect an embedded signal. In another example, some LEDs may be able to toggle at different rates or frequencies. Accordingly, multiple mobile devices may be allocated a different frequency in which the LED toggles in which it will attempt to detect an embedded signal.

Several LEDs are also placed along the right side of the room 402 near or on several destination locations. The destination location 404 will be described as the destination location for the client computing device 102. The client computing device 102 will move into and around the room, receiving identification codes from LEDs that the client computing device 102 is in close proximity to, and transmit the received identification codes to the controller 112. In some embodiments, as will be explained below, the client computing device 102 can also transmit unique device identification information that will be utilized by the controller 112 to generate updated embedded identifiers provided to the LEDs. The controller 112 will then identify the current location of the client computing device 102 and transmit user interface data to direct the user to the destination location 404.

Figure 4B:
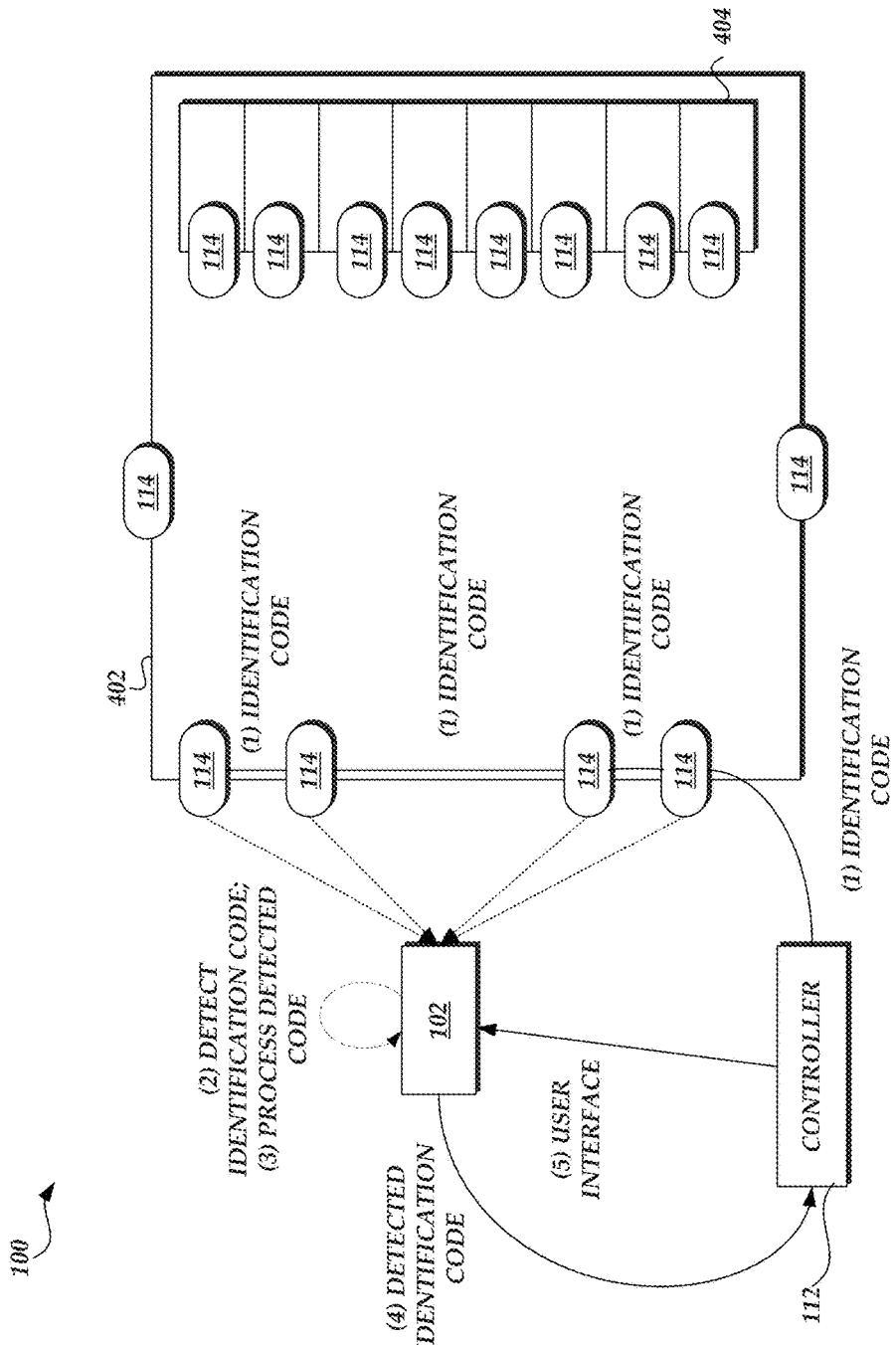
FIG. 4B is a block diagram of the LED communication system of FIG. 1 illustrating the first interaction between the illustrated components for establishing a communication connection between the client computing device and the service provider, and identifying the location of the client computing device in accordance with an illustrated embodiment.

With reference to FIG. 4B, at (1), the LED communication system 100 illustrating the first interaction between the illustrated components for establishing a communication connection between the client computing device and the service provider, and identifying the location of the client computing device will be described. The controller 112 generates unique identification codes for each LED 114. According to some aspects of the present application, the controller 112 transmits individual identification codes to each of the LEDs 114 that are located near the left wall of the room 402. The identification codes help to identify the location of the client computing device 102. For example, each LED can receive one or more unique identification codes.

The LEDs 114 can receive the identification codes and transmit the codes as encoded successive light emissions, such as by turning off and on. The LEDs 114 may be preprogrammed to automatically transmit the identification codes upon receipt. In some embodiments, the LEDs 114 may process the identification codes and transmit a signal derived from the identification codes and other data. The LEDs 114 may be located on a wall, on a ceiling, on the ground, in locations where light emissions can be captured by a client computing device 102, embedded within light fixtures, and the like. In some aspects of the present application, the LEDs 114 may determine when the transmissions occur. For example, transmissions may occur immediately upon receipt of the identification codes, at the same time, at different times, etc. As illustrated in the example of FIG. 4A, each of the LEDs 114 located near the left wall of the room 402 broadcast the identification code.

At (2), the client computing device 102 detects the identification code transmitted by the LEDs 114. Additionally, although depicted as receiving all four identification codes from the LEDs 114 located near the left wall of the room 402, the client computing device 102 may receive a subset of identification codes transmitted by the LEDs 114. For example, the client computing device 102 may receive only the identification codes transmitted by the bottom LED 114 located near the left wall of the room 402. This would allow the controller 112 to determine a current location of the client computing device 102. For example, the controller 112 may determine that the client computing device is close to the bottom left corner of the room 402.

At (3), the client computing device 102 processes the detected identification code to identify information such as by validating security information, requesting additional information or determining the characteristics of the requesting controller 112. The client computing device 102 may determine a path between the current location of the client computing device 102 and a destination location 404, and identify a subset of LEDs that are determined to be in the path. In other embodiments, at least some of the processing occurs in other components of the LED communication system 100, such as at the controller 112. For instance, the controller 112 may determine the location of the client computing device 102 based on the one or more identification codes received by the client computing device 102, determine a subset of LEDs determined to be in a path of travel, and transmit updated identification codes to the subset of LEDs on the path of travel. As previously discussed, in one embodiment, the updated identification code can include, at least in part, unique identification information provided by the client computing device 102 in reporting the first embedded identification code. For example, the updated identification code can correspond to at least a portion of a MAC address previously transmitted by the client computing device 101 to the controller.

If the client computing device 102 receives more than one identification code from multiple LEDs 114, then the client computing device 102 may process the identification codes to determine a current location of the client computing device 102. To illustrate, the client computing device 102 may determine the location of the client computing device 102 based on a magnitude of the signals received from the LEDs 114. The LED 114 of the signal with the greater received magnitude in signal strength by the client computing device 102 may be chosen. Weightings can be applied based on the magnitude to estimate a location in between the LEDs 114. Moreover, time stamps of the received signals may be used. For instance, the first received identification code may be given more weight than or may be used rather than the later received identification code.

At (4), the client computing device 102 transmits the detected identification code to the controller 112. The client computing device 102 may also transmit authentication information, user, or client computing device data to identify a profile, information for use in the operation of the controller 112, or the like.

At (5), the controller 112 identifies the location or profile of the user or client computing device 102. The client computing device 102 may receive from the LEDs 114 and transmit to the controller 112 two or more identification codes. The controller 112 may determine the location of the client computing device 102 based on characteristics of the received data from the client computing device 102. For example, the controller may determine the location of the client computing device 102 based on the magnitudes of the signals received by the client computing device 102, based on the arrived time (a time stamp) of the signals received by the client computing device 102, or choose a location between the two or more LEDs that transmitted the identification codes received by the client computing device 102.

Figure 7:
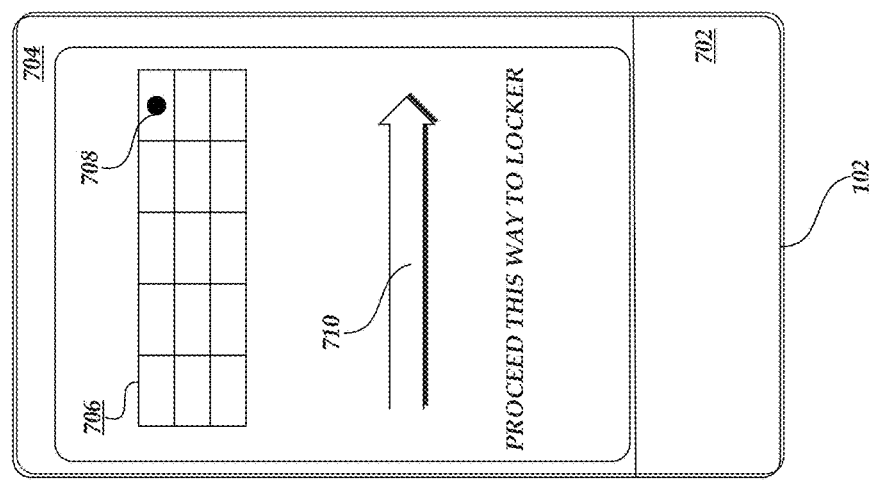
FIG. 7 is an example user interface illustrative of a remote device displaying a user interface for guiding a user of the remote device to a particular location in accordance with an illustrated embodiment.

The controller 112 transmits user interface data to the client computing device 102. The user interface data can be used to configure the display of the client computing device 102, such as the browser or an application 104. In some embodiments, the user interface data changes the display of a mobile application. For instance, the application can display the current location of the client computing device 102 and the destination location 404 based on the user profile. Furthermore, the user interface data may include a visual indicator indicative of the path to the destination location 404, such as an arrow in the direction of the destination location 404. FIG. 7, described in more detail below, illustrates an example of an arrow facing in the direction of the destination location 404.

The interactions of FIG. 4B allow a user of a client computing device 102 to be connected to the LED communication system 100 without having to manually check-in, whether physically or electronically.

With reference now to FIG. 4C, the LED communication system 100 illustrating the second interaction between the illustrated components for updating the location of the client computing device by transmitting an updated identification code, detecting and processing the identification code, and updating a user interface of the client computing device will be described. At (1), the controller 112 transmits identification codes to the LEDs 114. The identification codes may be unique to the LED 114, and thus each LED 114 may be receiving and transmitting its own identification code. In some embodiments, the controller 112 transmits an updated identification code to the LEDs 114, such as at different stages of the path of travel. In other embodiments, the controller 112 transmits the same unique identification code to at least a subset of the LEDs 114. For the purpose of an illustrative example, the controller 112 transmits individual updated identification codes to a subset of LEDs 114 that are in the path of travel between the current location of the client computing device 102 and the destination location 404 based on the user profile. In some embodiments, the controller 112 may also transmit the updated identification codes to all, or at least a subset of, LEDs 114. The controller 112 may also transmit the identification codes separated in time slots. In turn, the client computing device 102 can read the transmissions of the LEDs 114 at certain time slots. The controller 112 may also transmit a visual indicator to a subset of LEDs 114 that are in the path of travel. One or more LEDs 114 that receive the visual indicator may perform an action to indicate to the user the path of travel, such as blinking at a rate that is visible to the human eye, changing the color of the LED 114, increasing the brightness of the LED 114, other visible differences from other light in the room, audible or other sensory notifications, or the like.

At (2), the client computing device 102 detects the updated identification code, and at (3), processes the detected identification code. At (4), the client computing device 102 transmits the detected identification code to the controller 112, and at (5), the controller 112 transmits an updated user interface to the client computing device 102. The updated user interface data is indicative of the updated current location of the client computing device 102, which is near the LED close to the bottom of the room 402, and other information that may be useful, such as distance to the destination location 404, a time to reach the destination location 404, etc.

The updated user interface data may also include directional data indicative of the direction of movement of the mobile device. In some embodiments, the controller 112 or the client computing device 102 may determine whether the client computing device 102 is moving in the direction of the destination location 404. In response to determining that the direction of movement is substantially divergent from the determined path of travel to the destination location 404, then the updated user interface data may display a visual indicator indicative of an incorrect direction of movement or indicative of the correct direction of movement.

The interactions of FIG. 4C may repeat with the same or different LEDs 114 until the client computing device 102 is near the destination location 404. As the client computing device 102 moves toward or away from the destination location 404, the client computing device 102 can be in closer proximity with another LED 114. In such a case, the interactions of FIG. 4C may occur between the client computing device 102 and the LED 114 that is now in closer proximity than a previous LED 114. The interaction with the new LED 114 may thus be handed over from the prior LED 114.

Figure 4D:
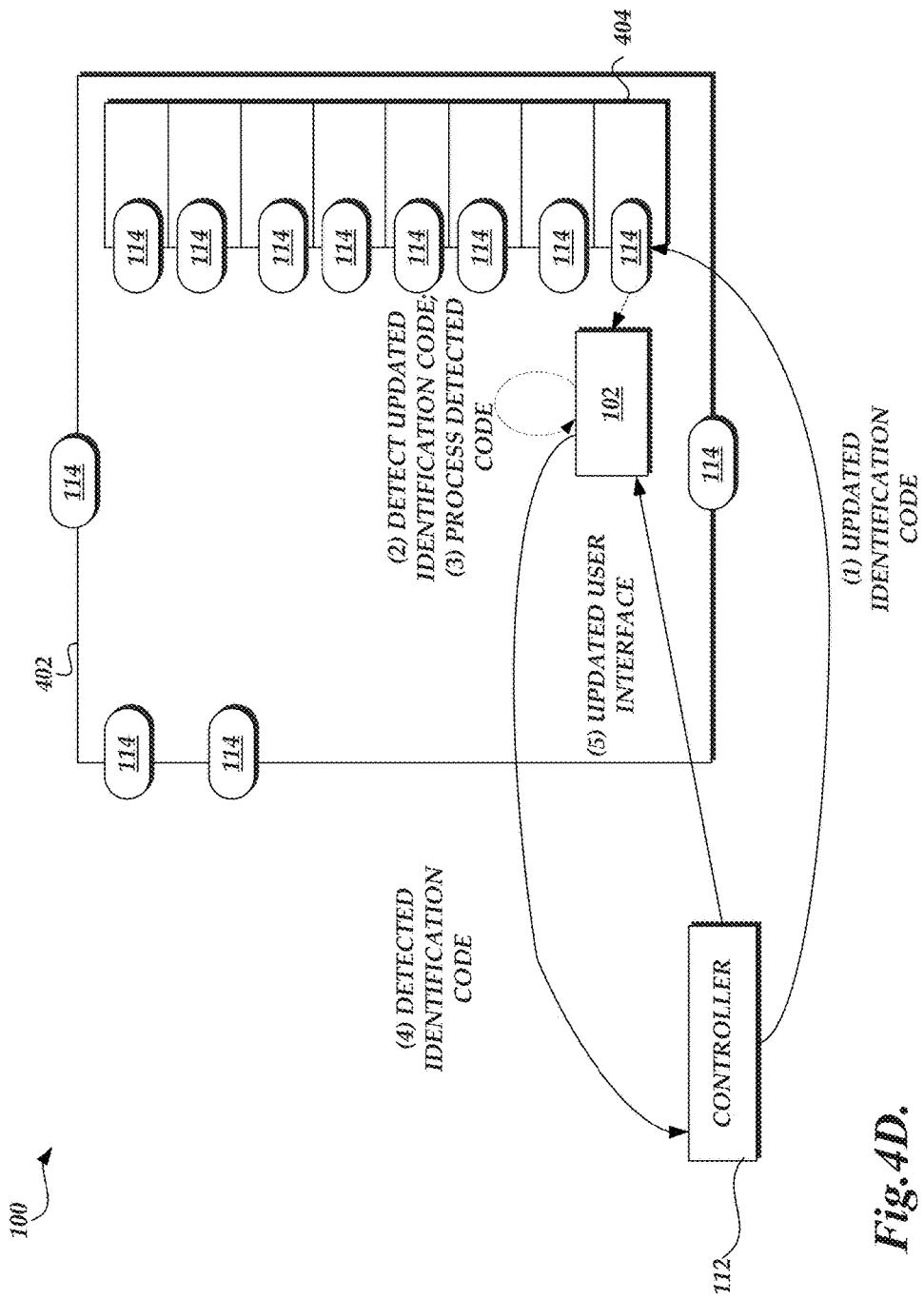
FIG. 4D is a block diagram of the LED communication system of FIG. 1 illustrating the third interaction between the illustrated components for determining that the client computing device is near the destination location by transmitting an updated identification code, detecting and processing the identification code, and updating a user interface in accordance with an illustrated embodiment.

With reference to FIG. 4D, the LED communication system 100 illustrating the third interaction between the illustrated components for determining that the client computing device is near the destination location by transmitting an updated identification code, detecting and processing the identification code, and updating a user interface will be described. At (1), the controller transmits an updated identification code to the LEDs 114. At (2), the client computing device 102 detects the updated identification code, and at (3), processes the detected identification code. At (4), the client computing device 102 transmits the detected identification code to the controller 112. The controller 112 determines that the client computing device 102 is near the LED indicative of the destination location 404. In some embodiments, the controller 112 transmits a vendor activation signal to identify an action to be implemented by a vendor corresponding to the mobile device. For example, when the client computing device 102 sends a detected identification code to the controller 112 indicative of the LED 112 near the destination location 404, the controller 112 may send a signal to a locker located near the destination location 404 to automatically open. In some embodiments, the controller 112 sends an updated user interface to the client computing device 102, such as illustrating the location of the locker. FIG. 7, which will be described in more detail below, shows a grid of lockers and the location of the locker associated with the user profile.

In some embodiments, the interactions of FIG. 4A-4D may occur when a destination location 404 is ready for the user of the client computing device 102. For example, staff members may place an item in the destination location 404 for the user to pick up. In other examples, the locker in the destination location 404 may be cleared for the user of the client computing device 102 to place an item in the locker. The interactions of FIG. 4A-4D may also be applied to service devices of staff members placing an item or retrieving an item in the destination location 404. The destination location 404 may also be a location where payment is made for a user of the client computing device to purchase an item.

Turning now to FIGS. 5A-1, 5A-2, and 5B, illustrative interactions between the components of the LED communication system 100 to locate a client computing device 102 and to provide a staff member the current location of the client computing device 102 in response to a help request will be described. More specifically, FIGS. 5A-1, 5A-2, and 5B will be described with regard to interactions between a client computing device 102, an service device 102B (such as a device for a staff member), LEDs 114, and a controller 112. Additionally, although depicted as a single client computing device 102, in some embodiments, the LED communication system 100 can interact with a plurality of client computing devices 102 using the same processes illustrated in FIGS. 5A-5B.

With reference to FIG. 5A-1, the LED communication system 100 illustrating the interaction between the illustrated components for requesting help from a client computing device by detecting and processing an identification code, and transmitting a request for help will be described in further detail. At (1), the controller 112 generates an identification code and transmits individual identification codes LEDs 114 in the room 402. The LEDs 114 can receive the identification codes and transmit the codes as encoded successive light emissions, such as by turning off and on.

At (2), the client computing device 102 detects the updated identification code from the LED 114 located at the top of the room 402. At (3), the client computing device 102 processes the detected identification code. The client computing device 102 can determine the location of the client computing device 102 based on the identification code. In other embodiments, the controller 112 processes the identification code, such as identifying the location of the client computing device 102 by identifying the LED 114 that transmitted the identification code. For example, each LED can receive a unique identification code. Then based on the identification code, a controller 112 can identify which LED transmitted the received signal. At (4), the client computing device 102 transmits the detected identification code to the controller, such that the controller can process the current location of the client computing device 102.

Figure 8:
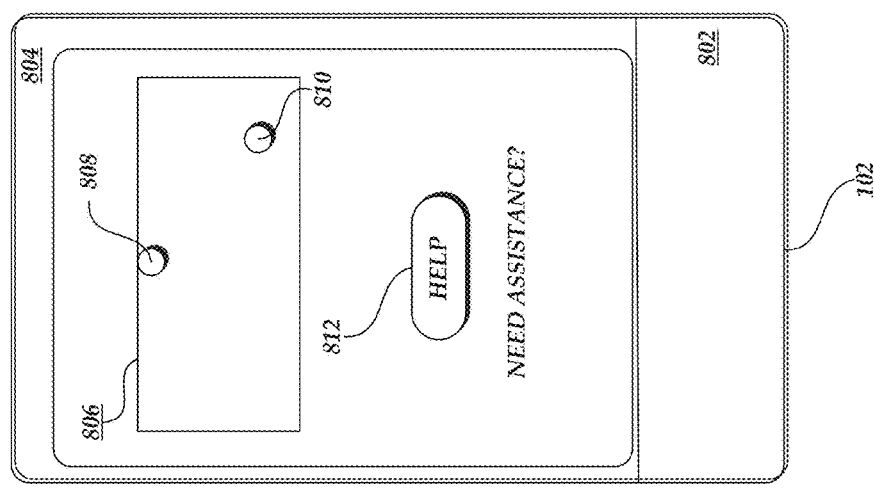
FIG. 8 is an example user interface illustrative of a remote device displaying a service call including a request for help in accordance with an illustrated embodiment.

Illustratively, at (5), the client computing device 102 may request for help. One example user interface, as will be described further below, is illustrated in FIG. 8. At (6), the controller 112 generates a service call based on the request for help received from the client computing device 102.

With reference to FIG. 5A-2, the LED communication system illustrating the interaction between the illustrated components for locating the service device by detecting and processing an identification code and transmitting the identification code to the controller will be described in further detail. At (1), the controller 112 may transmit the identification codes to LEDs 114, at (2-3) service device 102B may detect and process the identification codes, the service device 102B can transmit the detected identification code to the controller 112, and the controller can identify the location of the service device 102B based on the detected identification code.

Figure 5B:
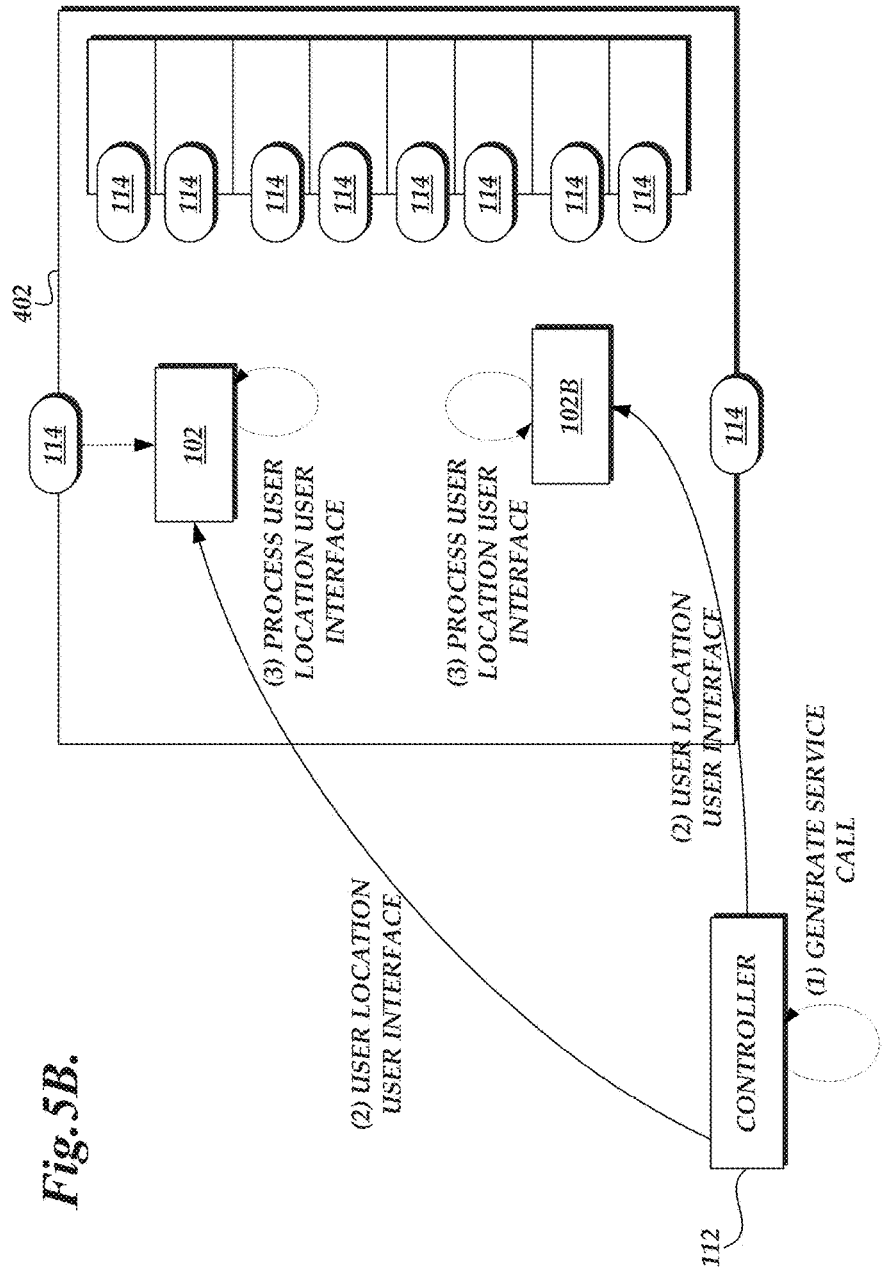
FIG. 5B is a block diagram of the LED communication system of FIG. 1 illustrating the interaction between the illustrated components for generating a user location user interface on the client computing device and the service device that visually indicates the location of both devices in accordance with an illustrated embodiment.

Turning now to FIG. 5B, the LED communication system 100 illustrating the interaction between the illustrated components for generating a user location user interface on the client computing device and the service device that visually indicates the location of both devices will be described in further detail. A user of a client computing device 102 may request that a staff member to come to the location of the user. The controller 112 receives the request for help. At (1), the controller 112 generates a service call. The service call may include identification of a service device 102B. The service device 102B can be identified based on several characteristics, such as the type of help inquiry, the closeness of the service device 102B to the client computing device 102, or the like.

At (2), the controller 112 transmits the user location user interface data to the service device 102B and the client computing device 102. Then at (3), the client computing device 102 and the service device 102B can process the user location user interface data. For example, the user location user interface data may include the location of the client computing device 102, the location of the service device 102B, and a path of travel between the client computing device 102 and the service device 102B. This enhances customer service by allowing a staff members to locate users in need, or for users to find staff members with ease and quickness. In other embodiments, the controller 112 sends the user location user interface data to either the client computing device 102 or the service device 102B.

In some aspects of some embodiments of the present application, the controller 112 detects the location of the service device 102B in the same way described in FIG. 5A for the client computing device 102. Thus, the LED communication system 100 allows for tracking multiple devices at the same time. A different identification code may be transmitted to the LEDs to be received by different computing devices, such as the service device 102B and the client computing device 102. In other embodiments, the same identification code is transmitted.

Figure 6:
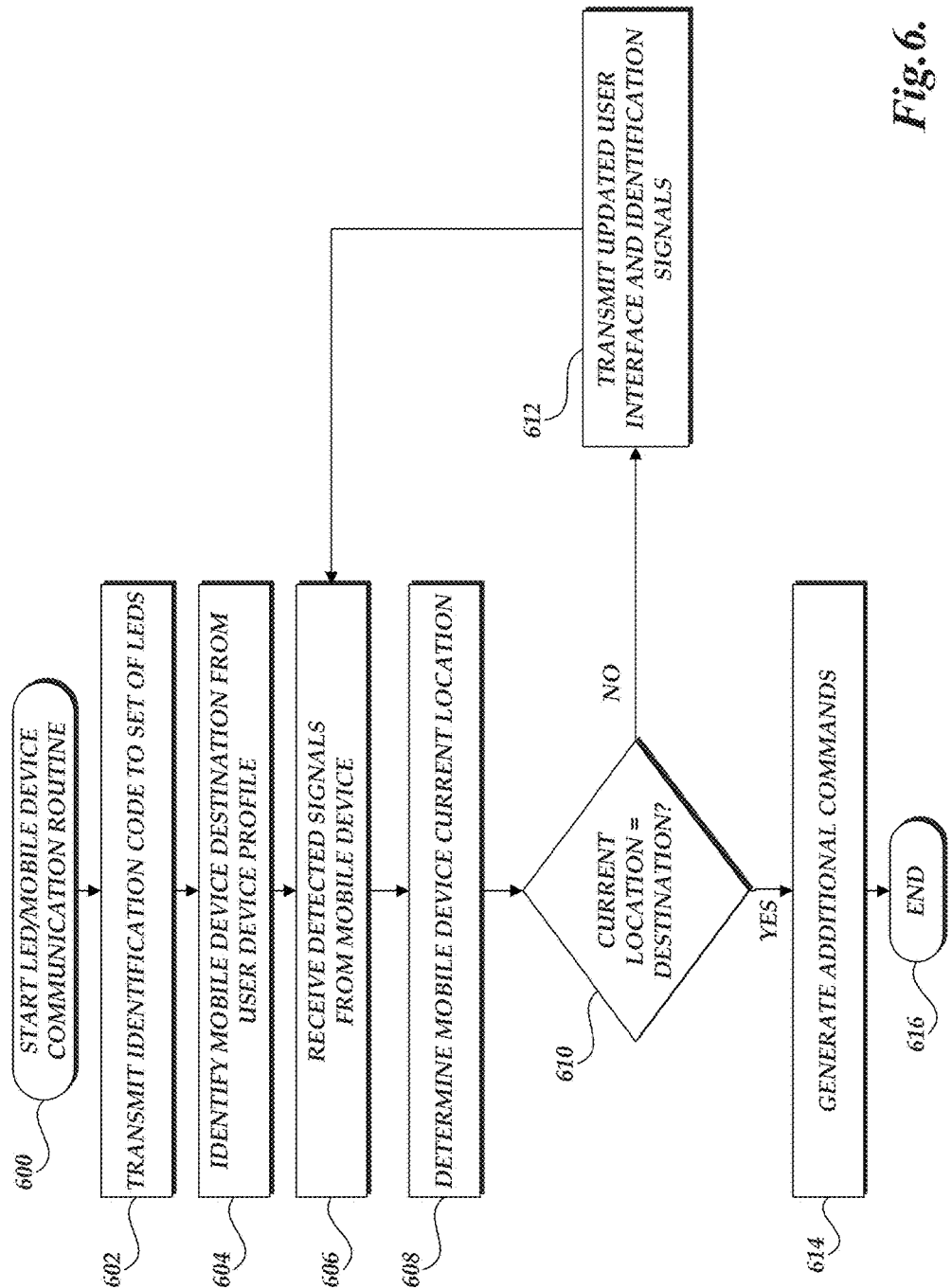
FIG. 6 is a flow diagram illustrative of an LED and remote device communication routine by the service provider in accordance with an illustrated embodiment.

FIG. 6 is a flow diagram illustrative of the LED 114 and mobile device communication routine by the service provider 110 in accordance with an illustrated embodiment. At block 602, the controller 112 transmits an identification code to a set of LEDs 114. The set of LEDs 114 may be indicative of the LEDs that are in the path of travel between the current location of the client computing device 102 and the destination location 404. As described previously, the controller 112 generates an identification code and transmits individual identification codes to each of the LEDs 114. The identification codes help to identify the location of the client computing device 102 by identifying the LED 114 that transmitted the particular identification code.

The controller 112 can receive detected signals from the client computing device 102 (such as a mobile device) to identify a user device profile. Then at block 604, the controller 112 can identify a mobile device destination location base on the user device profile. The destination location may be the destination location of a locker where the user will pick up or drop off an item. The destination location may also be a location where another device is located, such as the service device 102B, devices owned by other users, or the like.

At block 606, the controller 112 receives detected signals from the mobile device, including one or more identification codes. At block 608, the controller determines the current location of the mobile device based on the detected signals. The detected signals include encoded identification codes transmitted by an LED 114 by successive light emissions and received by the client computing device 102. At block 610, the controller 112 will determine if the current location of the mobile device is at the destination location based on the user profile. If not, then at block 612, the controller 12 transmits an updated user interface to the mobile device to guide the user of the mobile device in the direction of the destination location, and transmits additional identification signals that the client computing device 102 can detect. If the current location of the of the mobile device is at the destination location based on the user profile, then at block 614, the controller can generate additional commands, such as identifying one or more action suggestions based on processing the received signals including the identification code. To illustrate, one action suggestion can be transmitting a mobile device indicator to a locker system to perform an action based on the mobile device indicator. Another action suggestion is to transmit the identification code to the service device 102B.

Turning now to FIGS. 7 and 8, illustrative user interfaces of a client computing device 102. FIG. 7 is an example user interface illustrative of a client computing device 102 displaying a user interface for guiding a user of the client computing device 102 to a particular location in accordance with an illustrated embodiment. The client computing device 102 may include a screen 704 and an input interface circuit 702. The user interface shows a grid of lockers 706, and also shows a visual indicator of the locker of interest 708. Arrow 710 instructs the user of the client computing device 102 by pointing toward the direction of the destination location 404. Furthermore, the text below the arrow 710 explains that the arrow is describing the direction to the locker: "proceed this way to locker."

The service provider 110 can perform real-time tracking of client computing devices 102 and service devices 102B. The tracking data can be used to generate a map that illustrates the locations of the devices. This map may be used to optimize workflow and assess user behavior. For example, if a client computing device 102 requests for help, the map may be used to determine the nearest service device 102B. If a certain area has many client computing devices 102, the service provider may use the map to instruct users of the service device 102B to congregate in a particular area.

FIG. 8 is an example user interface illustrative of a client computing device 102 displaying a service call including a request for help in accordance with an illustrated embodiment. The user interface of the client computing device includes a screen 804 and an input interference circuit 702. The user interface displays a map 806 with indicators 807, 808. The indicator 807 describes the location of the service device 102B, and the indicator 808 describes the current location of the client computing device 102. The screen 804 includes a help button 810 that initiates a request for assistance. The text below the button 810 explains that pressing the button means that the user of the client computing device 102 needs help: "need assistance?"

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for modifying a path of travel comprising:
    transmitting independent location identifiers to individual light-emitting diodes ("LEDs") of a set of LEDs, wherein transmitting the independent location identifiers causes the individual LEDs to emit respective independent location identifiers encoded as a series of successive light emissions;
    receiving an identification of one or more independent location identifiers from a client computing device; and
    identifying one or more action suggestions based on processing the received identification of one or more independent location identifiers.

2. The computer-implemented method of claim 1 further comprising transmitting a vendor activation signal to identify an action to be implemented by a vendor corresponding to the client computing device.

3. The computer-implemented method of claim 1, wherein the one or more action suggestions comprise:
    receiving an identification of one or more second independent location identifiers from the client computing device;
    identifying an updated current location of the client computing device based on the one or more identified second location identifiers; and
    transmitting a signal to the client computing device indicating that the client computing device is near the destination location.

4. The computer-implemented method of claim 1 further comprising:
    obtaining one or more additional independent location, identifiers, wherein the additional independent location identifiers correspond to a second client computing device; and
    transmitting additional independent location identifiers to individual LEDs of a subset of LEDs.

5. The computer-implemented method of claim 4, wherein the one or more action suggestions comprise:
    obtaining unique identifier information from the client computing device,
    wherein transmitting the additional independent location identifiers to the individual LEDs of the subset of LEDs includes transmitting the additional location identifiers based at least in part on the unique identifier information.

6. The computer-implemented method of claim 1, wherein the one or more action suggestions comprise transmitting a current location of the client computing device to a service device.

7. The computer-implemented method of claim 1 further comprising receiving, from the client computing device, directional data indicating a direction of movement of the client computing device.

8. The computer-implemented method of claim 1 further comprising authenticating the client computing device based on the received one or more independent location identifiers from the client computing device.

9. The computer-implemented method of claim 1 further comprising, if the client computing device receives two or more location identifiers, determining the location of the client computing device based on a signal strength of individual location identifiers of the two or more Location identifiers.

10. The computer-implemented method of claim 1 further comprising, if the client computing device receives two or more location identifiers, determining the location of the client computing device based on time stamps of the individual location identifiers of the two or more location identifiers.

11. The computer-implemented method of claim 1 further comprising, if the client computing device receives two or more location identifiers, determining a location of the client computing device based at least in part on locations associated with individual location identifiers of the two or more location identifiers.

12. A system for modifying a path of travel of a client computing device, the system comprising:
    a plurality of light-emitting diodes ("LEDs"), wherein individual LEDs of the plurality of LEDs are independently configured to transmit location identifiers encoded as a series of successive light emissions;
    the client computing device, wherein the client computing device is configured to detect location identifiers of individual LEDs based on a proximity of the client computing device to the LED;
    a data store configured to store computer-executable instructions; and
    a processor in communication with the data store, wherein the computer-executable instructions, when executed by the processor, configure the processor to perform operations including:
        receiving information regarding one or more location identifiers detected by the client computing device;
        identifying, based at least in part on processing the information regarding the one or more location identifiers, one or more modifications of the path of travel of the client computing device; and
        causing transmission of the one or more modifications to the client computing device.

13. The system of claim 12, wherein the one or more modifications to the path of travel are based at least in part on a destination location of the client computing device.

14. The system of claim 13, wherein the operations further include determining the destination location of the client computing device.

15. The system of claim 12, wherein the operations further include determining a location of the client computing device based at least in part on the information regarding the one or more location identifiers.

16. The system of claim 15, wherein determining the location of the client computing device comprises:
obtaining a location associated with each of the one or more location identifiers; and
determining the location of the client computing device based at least in part on the location associated with each of the one or more location identifiers.

17. The system of claim 16, wherein the information regarding the one or more location identifiers includes a magnitude of each of the one or more location identifiers, and wherein determining the location of the client computing device is based at least in part on the magnitude of each of the one or more location identifiers.

18. The system of claim 12, wherein the operations further include:
receiving information regarding a second one or more location identifiers detected by the client computing device;
identifying, based at least in part on processing the information regarding the second one or more location identifiers, an updated one or more modifications of the path of travel of the client computing device; and
causing transmission of the updated one or more modifications to the client computing device.

19. A computer-implemented method for modifying a path of travel of a mobile device, the computer-implemented method comprising:
causing individual light emitting diodes ("LEDs") of a set of LEDs to broadcast respective location identifiers, wherein each location identifier is encoded as a series of successive light emissions;
obtaining information regarding a first set of location identifiers detected by a sensor on the mobile de vice;
determining, based at least in part on the information regarding the first set of location identifiers, a first location of the mobile device;
receiving, from the mobile device, information regarding a second set of location identifiers detected by the sensor on the mobile device;
determining, based at least in part on the first set of location identifiers and the second set of location identifiers, a path of travel of the mobile device;
determining one or more modifications to the path of travel, the one or more modifications causing the path of travel to converge on a destination; and
causing the mobile device to display one or more visual indicators associated with the one or more modifications to the path of travel.

20. The computer-implemented method of claim 19, wherein the path of travel of the mobile device is determined based at least in part on a direction of travel of the mobile device.

* * * * *